United States Patent [19]
Torti, Jr. et al.

[11] 3,911,188

[45] Oct. 7, 1975

[54] HIGH STRENGTH COMPOSITE CERAMIC STRUCTURE

[75] Inventors: Maurice L. Torti, Jr., Boston; David W. Richerson, Auburn, both of Mass.

[73] Assignee: Norton Company, Worcester, Mass.

[22] Filed: July 9, 1973

[21] Appl. No.: 377,547

[52] U.S. Cl. ............... 428/218; 106/44; 117/106 A; 117/106 C; 117/123 A; 117/169 R; 117/DIG. 12; 428/212; 428/446; 428/539
[51] Int. Cl.² .................... C04B 35/56; C04B 35/58
[58] Field of Search .................... 161/182, 206, 166; 117/DIG. 12, 123 A, 69, 169, 106 R, 106 A, 106 C, 169 R; 106/44

[56] References Cited
UNITED STATES PATENTS

| | | | |
|---|---|---|---|
| 2,618,565 | 11/1952 | Nicholson | 106/44 |
| 2,752,258 | 6/1956 | Swentzel | 106/44 |
| 3,468,992 | 9/1969 | Lubatti et al. | 106/44 |
| 3,520,722 | 7/1970 | Scott | 117/106 A |
| 3,541,589 | 11/1970 | Lubatti et al. | 117/123 A |
| 3,577,285 | 5/1971 | Rutz | 117/106 A |
| 3,619,240 | 11/1971 | Lodelinsart et al. | 117/40 |
| 3,713,877 | 1/1973 | Kirchner et al. | 117/123 A |
| 3,824,120 | 7/1974 | Davidge et al. | 117/106 A |
| 3,853,567 | 12/1974 | Verbeek | 106/44 |

FOREIGN PATENTS OR APPLICATIONS

| | | |
|---|---|---|
| 887,942 | 1/1962 | United Kingdom |

*Primary Examiner*—Harold Ansher
*Attorney, Agent, or Firm*—Oliver W. Hayes

[57] ABSTRACT

A hot pressed ceramic body is formed of a sandwich comprising an interior layer of a ceramic material having a given coefficient of thermal expansion and two outer surface layers formed of a ceramic material having a lower coefficient of thermal expansion. When the product is formed as a unitary sandwich by hot pressing at elevated temperature the outer layers are put under compression as the body is cooled to room temperature. A preferred form of the invention involves a central layer of a mixture of silicon carbide and silicon nitride and the external layers are pure silicon nitride.

7 Claims, 1 Drawing Figure

2.85 MICRONS PER DIVISION

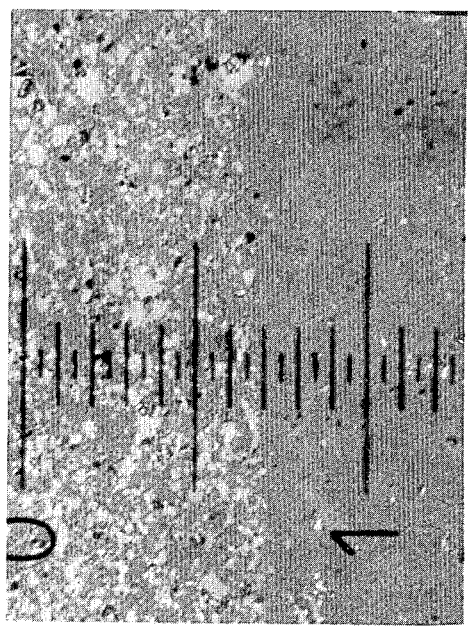
2.85 MICRONS PER DIVISION 3,911,188

HIGH STRENGTH COMPOSITE CERAMIC STRUCTURE

BACKGROUND OF THE INVENTION

Among the principal objectives of ceramic research in recent years has been the production of ceramic materials of high strength and high impact resistance for use at elevated temperatures and corrosive gas in conditions such as gas turbines and the like. While some progress has been made towards these objectives there is still much room for improvement.

It is the principal object of the present invention to provide a ceramic material highly resistant to oxidation which has good high temperature strength and which has very high strength at room temperature with high impact resistance.

PRIOR ART

None of the prior art accomplishes the objectives of the present invention although some of it does show multi-layer composite ceramic structures. For example, U.S. Pat. No. 2,609,318 to Swentzel shows a reaction sintered mixture of silicon carbide and silicon nitride having an outer surface which is purer than the inner surface. While the test procedures are not given in the Swentzel patent the modulus figures are enormously lower than those obtained in the present invention. U.S. Pat. No. 3,060,543 to Shaw describes a refractory brick having a backing layer of heat insulating refractory and a surface layer of silicon carbide. To counteract the difference in contraction during firing between the refractory mix of silicon carbide and the backing layer, a layer of silicon carbide, of double thickness, is placed on both sides of the refractory layer, and the refractory layer is sliced through its center after firing. U.S. Pat. No. 3,165,864 to Shulze describes a hot pressed body having a surface of a pure carbide or nitride which grades into a mixture of carbides, nitrides etc.

U.S. Pat. Nos. 3,619,240 to Lodelinsart et al and 3,713,877 to Kirchner et al describe a method of strengthening ceramic bodies by forming a reaction layer on the surface, which layer is under compression. While Kirchner et al is the more pertinent to the present invention of these two patents it is clear that his products come far short of demonstrating the kinds of strengths achieved by the hot pressed composites of the present invention.

German Pat. No. 2,134,073 to Lumby and Coe describes composite compacts made by pressing a mixture of silicon nitride, magnesium oxide and silica onto a silicon nitride substrate. The products apparently gave strengths merely comparable to those obtained by hot pressed silicon nitride.

In addition there is some work described in "Review of Ceramic Technology," December 1972, directed to the attempts of Kirchner, Platts and Gruver of Ceramic Finishing Company to strengthen hot pressed silicon carbide and silicon nitride by formation of a compressive surface layer. The attempts, which were apparently unsuccessful, were to form a silicon nitride layer on a silicon carbide substrate. In one test a hot pressed silicon carbide substrate was packed in silicon nitride powder and heated to an elevated temperature. In another the hot pressed silicon carbide specimen was coated with a mixture of silicon nitride and silicon and then reaction sintered.

BRIEF DESCRIPTION OF THE PRESENT INVENTION

In the present invention the results which have been sought by the prior art and which have, to date, escaped the prior workers are accomplished by the fairly simple, but effective, method of hot pressing a unitary sandwich under such condition that the surface layers are locked into a state of compressive stress. This is achieved by providing surface layers of silicon nitride, for example, which have a coefficient of thermal expansion of less than $3.3 \times 10^{-6}/°C$ (e.g. about $3.17 \times 10^{-6}/°C$). The internal layer is a mixture, for example, of silicon nitride and silicon carbide which will have a thermal expansion somewhat higher (e.g. about $3.8 \times 10^{-6}/°C$) than the thermal expansion of the external layers. In a preferred method of practicing the invention a first layer of silicon nitride powder is placed in the press and a second layer of mixed silicon nitride and silicon carbide powder is then placed on top of the silicon nitride layer. This second layer is then covered with a third layer of pure silicon nitride powder. The three layers are then compressed under heat to sinter the particles together to form a unitary, bonded structure whose three layers are strongly bonded so that forces in the interior layer can be transmitted to the exterior layers without creating ruptures at the interfaces between the three layers. The excellent degree of bonding is shown in FIG. 1. FIG. 1 is a photomicrograph of the boundary between the $Si_3N_4$ and $Si_3N_4$-SiC layers at a magnification of 1,000× under reflected light on a polished surface. There are no pores or structural discontinuities at the boundary. The silicon nitride (darker material in the photograph) is a continuous phase across the boundary. There are no microfractures around any of the SiC particles.

EXAMPLE I

The starting powders had the following characteristics:

|  | $Si_3N_4$ | SiC |
|---|---|---|
| Average size | −100 mesh | 3 − 5 microns |
| Phases | 92% $αSi_3N_4$ | 6H$α$SiC |
|  | <8% $βSi_3N_4$ |  |
|  | <1% $Si_2ON_2$ |  |
| Impurities (Wt. %) |  |  |
| Mg | .01 − .1 | — |
| Ca | .02 − .1 | — |
| Fe | .2 − .4 | 1 − .3 |
| Al | .1 − .3 | .1 − .3 |

One batch of these powders was prepared by mixing 40 percent (by weight) with 60 percent $Si_3N_4$. The other batch was pure $Si_3N_4$, 3 percent of the $Si_3N_4$ weight of $MgCo_3$ added as a sintering aid to each batch. The mixtures were then ball milled in a slurry of isopropanol for approximately 17 hours in a tungsten carbide lined ball mill using tungsten carbide grinding media thus reducing the powders to the desired small size. A layer of $Si_3N_4$ powder comprising ⅓ the desired weight of the final sample was placed in a graphite mold. On top of this was placed a layer of the $Si_3N_4$/SiC mixture comprising another ⅓ of the desired weight. This was covered by another $Si_3N_4$ layer comprising the final ⅓ weight. The composite three layers were then hot-pressed under a pressure of 2,000 p.s.i. at 1750°C for 60 minutes.

The hot pressed sample was then cut into two pieces and machined to two different thicknesses of surface layers so that strength could be measured as a function of degree of compression. The first sample had an area ratio of surface layer ($Si_3N_4$) to interior layer ($Si_3N_4+SiC$) of 52/48. The second sample had a ratio of 40/60. An approximate calculation of the compressive stress in the outer layer can be calculated, where the coefficient ($\alpha$) of thermal expansion of the two materials is measured as $$\alpha\ Si_3N_4 + SiC\ (60/40\%) = 3.87 \times 10^{-6}/°C$$
$$\alpha\ Si_3N_4 = 3.17 \times 10^{-6}/°C$$

The difference in length between an unconnected unit length of $Si_3N_4$ and a unit length of a $Si_3N_4/SiC$ composite formed at 1720°C and then cooled to room temperature would be:

$$\Delta l = 1700°C \times (3.87 - 3.17) \frac{\cdot 10^{-6}}{°C} \quad (1)$$
$$= 0.70 \times 10^{-3}$$

Since the pieces are not free to contract at their own rate but must end up the same length (or crack) the sum of the strain in the $SiC + Si_3N_4$ pieces must equal the unconstrained differences in length, i.e., $$\Delta l = |\epsilon_n| + |\epsilon_c| \quad (2)$$

Further, since there can be not net forces exerted on this free body the compressive force in the $Si_3N_4$ must equal the tensile force in the SiC or $$F_n = F_c \quad (3)$$

where F = EA  Where E = Elastic modulus
and A = Cross sectional
area = 0.52 for $Si_3N_4$)Sample
0.48 for $SiC+Si_3N_4$) 1 therefore $|\epsilon_n| \times 45 \times 10^6 \times 0.52 = |\epsilon_c| \times 52 \times 10^6 \times 0.48$ (4)
and $|\epsilon_c| = 0.94 |\epsilon_n|$ (5)
substituting in eq (1) & (2)
$1.94 |\epsilon_n| = 0.7 \times 10^{-3}$ (6)
$|\epsilon_n| = 0.36 \times 10^{-3}$
Stress in $Si_3N_4 = |\epsilon_n| E_n = 0.36 \times 10^{-3} \times 45 \times 10^6 =$
15,000 psi compressive stress (7)

This composite had an average strength of 154,100 p.s.i.*

Sample 2  Area ratio $= \dfrac{Si_3N_4}{Si_3N_4+40SiC} = \dfrac{40}{60}$ (En) $\times 45 \times 10^6 \times .40 =$ (Ec) $\times 52 \times 10^6 \times .60$ (4)
(Ec) = .573 (En) (5)
1.573 (En) = 0.7 $\times 10^{-3}$ (6)
(En) = .445 $\times 10^{-3}$
Stress in $Si_3N_4 =$ (En) En= .445 $\times 10^{-3}$ 33 45 $\times 10^6$
= 20,000 psi (7)

This composite had an average strength of 174,400 psi*

For comparison, a $Si_3N_4$ control had a strength of 144,000 psi* and a 60 $Si_3N_4$-40 SiC sample had a strength of about 120,000 psi*.

*measured in 3-point bending

The composite approach was therefore quite effective in improving the bend strength. Since impact strength is partially controlled by bend strength, the impact would also be expected to be improved.

What is claimed is:

1. A hot pressed $Si_3N_4$ composite body having its outer layers locked into a state of compressive stress, said body comprising surface layers of $Si_3N_4$ having a predetermined coefficient of thermal expansion and an internal layer comprising a mixture of $Si_3N_4$ and a second ceramic compound which provides a coefficient of thermal expansion for said mixture which is greater than said predetermined coefficient of thermal expansion, said internal layer being intimately bonded to the outer layers by a continuous phase of said $Si_3N_4$, the area ratio of the outer layers to the internal layer being sufficiently large and the coefficient of thermal expansion of the internal layer being sufficiently greater than the coefficient of the outer layers that, with a hot pressing temperature of about 1,700°C, the compressive stress at room temperature in the outer layers is at least 15,000 p.s.i.

2. A hot pressed $Si_3N_4$ composite body having its surface layers locked into a state of compressive stress, said body comprising surface layers of $Si_3N_4$ having a coefficient of thermal expansion of less than 3.3 $\times$ $10^{-6}/°C$ and an internal layer comprising a mixture of $Si_3N_4$ and SiC intimately bonded by hot pressing to the surface layers, said internal layer having a coefficient of thermal expansion of sufficiently more than 3.3 $\times$ $10^{-6}/°C$ to provide a compressive stress in said surface layers of at least 10,000 p.s.i. as said composite body is cooled from 1,700°C to room temperature.

3. A hot pressed $Si_3N_4$ composite body having its surface layers locked into a state of compressive stress, said body comprising surface layers of $Si_3N_4$ and an internal layer comprising a mixture of $Si_3N_4$ and SiC intimately bonded by a continuous $Si_3N_4$ phase to the surface layers, said internal layer having a coefficient of thermal expansion greater than the coefficient of expansion of the surface layers by more than 0.2 $\times$ $10^{-6}/°C$ to provide a compressive stress in said surface layers of at least 5,000 p.s.i. as said composite body is cooled from 1,700°C to room temperature.

4. A hot pressed $Si_3N_4$ composite body having its surface layers locked into a state of compressive stress, said body comprising surface layers of $Si_3N_4$ and an internal layer comprising a mixture of $Si_3N_4$ and SiC intimately bonded by a continuous $Si_3N_4$ phase to the surface layers, the area ratio of the surface layers to the internal layer being sufficiently large and the coefficient of thermal expansion of the interior layer being sufficiently greater than the coefficient of the surface layers that, with a hot pressing temperature of about 1,700°C, the compressive stress at room temperature in the external layers is at least 15,000 p.s.i.

5. The product of claim 3 wherein said internal layer has a coefficient of thermal expansion which is at least 0.2 $\times$ $10^{-6}/°C$ more than the coefficient of thermal expansion of said surface layers.

6. The product of claim 4 wherein the internal layer has a SiC content between 20 percent and 60 percent.

7. The product of claim 4 wherein the compressive stress is at least 17,000 p.s.i.

* * * * *

UNITED STATES PATENT OFFICE
CERTIFICATE OF CORRECTION

PATENT NO. : 3,911,188
DATED : October 7, 1975
INVENTOR(S) : Maurice L. Torti, Jr.; David W. Richerson It is certified that error appears in the above-identified patent and that said Letters Patent are hereby corrected as shown below:

Column 3, line 31   "not" should read – no –

Column 3, line 58   "Stress in $Si_3N_4$ = (En) En=.445 x $10^{-3}$ 33 45 x $10^6$" should read –Stress in $Si_3N_4$ = (En) En=.445 x $10^{-3}$ 45 x $10^6$ –

Signed and Sealed this twenty-third Day of December 1975

[SEAL]

Attest:

RUTH C. MASON
Attesting Officer

C. MARSHALL DANN
Commissioner of Patents and Trademarks